US008542574B2

(12) United States Patent
Hidle (10) Patent No.: US 8,542,574 B2
(45) Date of Patent: Sep. 24, 2013

(54) APPARATUS AND METHOD FOR NETWORK ERROR PREVENTION

(75) Inventor: Frederick Hidle, Bryn Mawr, PA (US)

(73) Assignee: Honeywell International Inc., Morristown, NJ (US)

(*) Notice: Subject to any disclaimer, the term of this patent is extended or adjusted under 35 U.S.C. 154(b) by 1180 days.

(21) Appl. No.: 11/170,209

(22) Filed: Jun. 29, 2005

(65) Prior Publication Data

US 2007/0002756 A1 Jan. 4, 2007

(51) Int. Cl.
*G06F 11/07* (2006.01)

(52) U.S. Cl.
USPC .......................................... 370/216; 370/229

(58) Field of Classification Search
USPC ...... 370/229, 230.1, 231, 241–245, 250–252, 370/362–368; 714/1, 2, 4, 25, 36, 100; 713/1, 713/2
See application file for complete search history.

(56) References Cited

U.S. PATENT DOCUMENTS

| | | | | |
|---|---|---|---|---|
| 4,070,704 A | * | 1/1978 | Calle et al. | 713/100 |
| 4,500,951 A | * | 2/1985 | Sugimoto et al. | 700/81 |
| 4,584,663 A | * | 4/1986 | Tanikawa | 714/49 |
| 4,695,946 A | * | 9/1987 | Andreasen et al. | 714/31 |
| 5,265,124 A | * | 11/1993 | Staab et al. | 375/211 |
| 5,357,519 A | * | 10/1994 | Martin et al. | 714/25 |
| 5,544,154 A | * | 8/1996 | Glitho | 370/248 |
| 5,661,729 A | * | 8/1997 | Miyazaki et al. | 714/719 |
| 5,682,256 A | * | 10/1997 | Motley et al. | 398/115 |
| 5,689,726 A | * | 11/1997 | Lin | 710/10 |
| 5,838,924 A | * | 11/1998 | Anderson et al. | 709/239 |
| 5,894,423 A | * | 4/1999 | Ling et al. | 700/293 |
| 5,909,427 A | * | 6/1999 | Manning et al. | 370/219 |
| 5,970,064 A | * | 10/1999 | Clark et al. | 370/351 |
| 6,009,541 A | * | 12/1999 | Liu et al. | 714/36 |
| 6,065,053 A | * | 5/2000 | Nouri et al. | 709/224 |
| 6,067,286 A | * | 5/2000 | Jones et al. | 370/218 |
| 6,067,407 A | * | 5/2000 | Wadsworth et al. | 709/224 |
| 6,134,668 A | * | 10/2000 | Sheikh et al. | 713/310 |
| 6,205,564 B1 | * | 3/2001 | Kim et al. | 714/48 |
| 6,226,261 B1 | * | 5/2001 | Hurtta et al. | 370/219 |
| 6,438,635 B1 | * | 8/2002 | Date et al. | 710/113 |
| 6,516,442 B1 | * | 2/2003 | Wang et al. | 714/776 |
| 6,535,489 B1 | * | 3/2003 | Merchant et al. | 370/244 |
| 6,543,941 B1 | * | 4/2003 | Lampert | 385/58 |

(Continued)

OTHER PUBLICATIONS

Cisco Systems, Installing and Starting up the Hub. Trouble shooting, URL: http://www.cisco.com/univercd/cc/td/do/c/product/fhubs/fh400/fh400icg/fh4inst.htm.

(Continued)

*Primary Examiner* — Michael Thier
*Assistant Examiner* — Curtis A Alia (57) ABSTRACT

A method includes performing one or more tests at a network component. The network component is capable of transmitting frames of information in a network. The network component is also capable of enabling and disabling the transmitting of frames. The method also includes detecting a failure of at least one of the one or more tests. In addition, the method includes at least one of not enabling the transmitting of frames by the network component and disabling the transmitting of frames by the network component in response to the detected failure. As an example, the one or more tests may be performed in response to the network component powering on. The network component may be initially disabled from transmitting the frames, and the transmitting of frames is not enabled in response to the detected failure.

24 Claims, 4 Drawing Sheets

(56) References Cited

U.S. PATENT DOCUMENTS

| | | | |
|---|---|---|---|
| 6,550,017 B1* | 4/2003 | Moiin et al. | 714/4 |
| 6,587,960 B1* | 7/2003 | Barford et al. | 714/8 |
| 6,836,353 B1* | 12/2004 | Ramadas et al. | 359/298 |
| 6,874,147 B1* | 3/2005 | Diamant | 719/328 |
| 6,904,544 B2* | 6/2005 | DeRolf et al. | 714/43 |
| 7,043,569 B1* | 5/2006 | Chou et al. | 710/8 |
| 7,159,080 B1* | 1/2007 | Coatney et al. | 711/147 |
| 7,251,804 B1* | 7/2007 | Trimberger | 716/112 |
| 2002/0159400 A1* | 10/2002 | Park et al. | 370/282 |
| 2004/0221198 A1* | 11/2004 | Vecoven | 714/25 |
| 2005/0102557 A1* | 5/2005 | Davies et al. | 714/11 |
| 2006/0015643 A1* | 1/2006 | Orava et al. | 709/238 |
| 2006/0039289 A1* | 2/2006 | Beer et al. | 370/241 |
| 2006/0083172 A1* | 4/2006 | Jordan et al. | 370/241 |
| 2006/0083173 A1* | 4/2006 | Jordan et al. | 370/242 |
| 2006/0143530 A1* | 6/2006 | Largman et al. | 714/36 |

OTHER PUBLICATIONS

Cisco Systems, Cisco 3660 Modular Access Router Security Policy, 2001, URL: http://www.cisco.com.univercd/cc/td/do/c/product/access/acs_mod/cis3600/secure/3660fips.pdf.

Pung H K Ed, ArbNet: A Robust and Highly Confurable Local Network, Sep. 30, 1990, New York, IEEE, US, vol. 1, pp. 46-50.

Jansen A et al, Embedding Management Intelligence in the Network, Alcatel Telecomm. Review, Alcatel, Paris Cedex, FR, Jul. 2003, p. 4-5.

* cited by examiner

APPARATUS AND METHOD FOR NETWORK ERROR PREVENTION

TECHNICAL FIELD

This disclosure relates generally to communication networks and more specifically to an apparatus and method for network error prevention.

BACKGROUND

Communication networks, such as computing networks, routinely use switches, routers, and other devices to transport information across the networks. Each of these devices typically receives information in a network and identifies a destination for the information. Each of these devices then typically forwards the information, either directly to the destination or indirectly to the destination through one or more other devices.

Occasionally, a switch, router, or other device in a communication network fails. There are typically many possible causes for a failure, including a loss of power provided to a device or a failure in the hardware or software of the device. When a device such as a switch or router fails, the failure may cause erroneous, incorrect, or excessive network traffic to propagate on the communication network. For example, the failed device could broadcast "garbage" frames containing invalid information. The failed device could also fail to forward frames containing valid information. In addition, the failed device could fail to connect to other components in the network at the appropriate speed (such as 10 or 100 megabits per second) or using the appropriate settings (such as full duplex or half duplex).

SUMMARY

This disclosure provides an apparatus and method for network error prevention.

In one embodiment, a method includes performing one or more tests at a network component. The network component is capable of transmitting frames of information in a network. The network component is also capable of enabling and disabling the transmitting of frames. The method also includes detecting a failure of at least one of the one or more tests. In addition, the method includes at least one of not enabling the transmitting of frames by the network component and disabling the transmitting of frames by the network component in response to the detected failure.

In particular embodiments, the one or more tests are performed in response to the network component powering on. The network component is initially disabled from transmitting the frames, and the transmitting of frames is not enabled in response to the detected failure.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
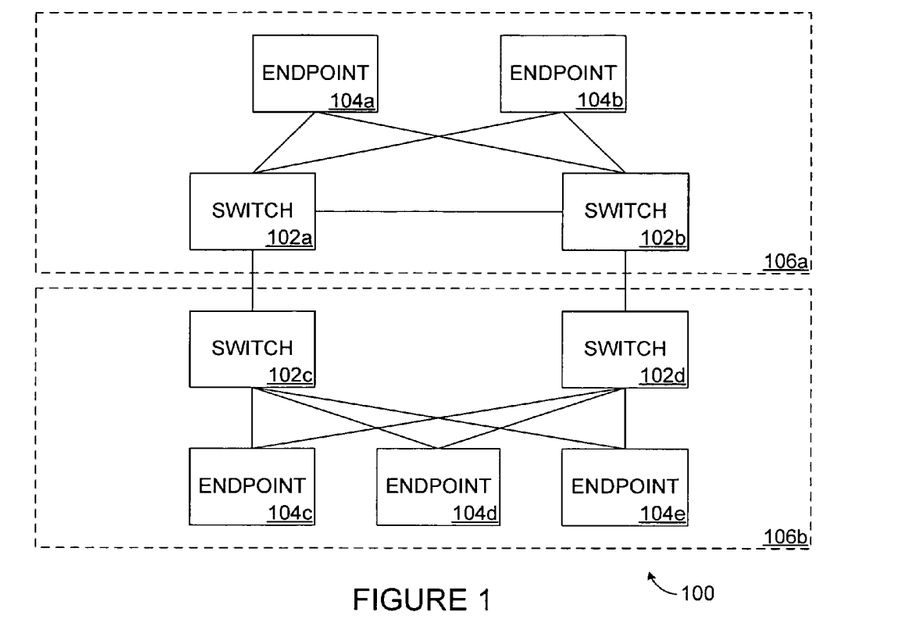
FIG. 1 illustrates an example communication network according to one embodiment of this disclosure.

FIG. 1 illustrates an example communication network 100 according to one embodiment of this disclosure. The embodiment of the communication network 100 shown in FIG. 1 is for illustration only. Other embodiments of the communication network may be used without departing from the scope of this disclosure.

Figure 2:
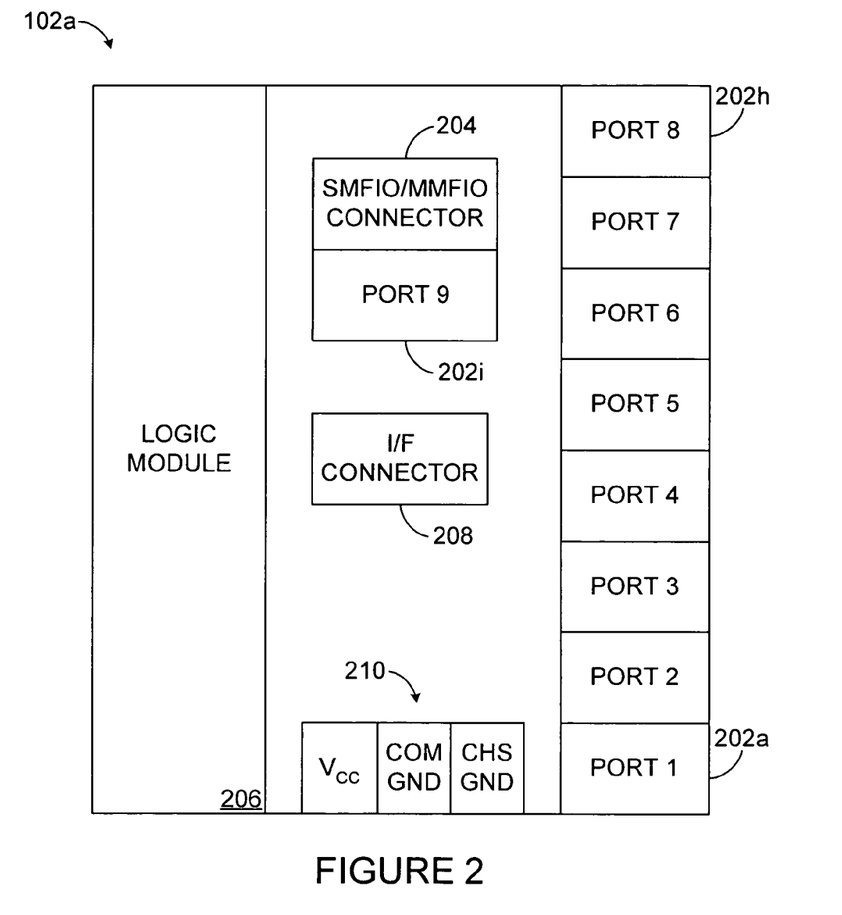
FIG. 2 illustrates an example switch in a communication network according to one embodiment of this disclosure.

In this example embodiment, the communication network 100 includes multiple switches 102a-102d and multiple endpoints 104a-104e. The switches 102a-102d communicate and transport information between various ones of the endpoints 104a-104e. For example, the switch 102a may receive information from the endpoint 104a and transmit the information to the switch 102c, and the switch 102c may receive and forward the information to one or more of the endpoints 104c-104e. Depending on the layout of the network 100, each of the switches 102a-102d is typically capable of forwarding traffic between one or more of the endpoints 104a-104e and/or one or more other switches. Each of the switches 102a-102d includes any hardware, software, firmware, or combination thereof for forwarding information in the network 100. One embodiment of the switches 102a-102d is shown in FIG. 2, which is described below.

The endpoints 104a-104e communicate with one another through the switches 102a-102d. The endpoints 104a-104e also perform any of a wide variety of additional functions in the network 100. For example, the endpoints 104a-104e could represent computing devices (such as desktop computers, laptop computers, personal digital assistants, and databases) that execute various applications for users. The endpoints 104a-104e could also represent control or manufacturing devices or systems in a process or production environment, such as controllers and other devices in a processing facility.

Depending on the function of the endpoints 104a-104e, the endpoints 104a-104e may communicate any suitable information through the switches 102a-102d. Also, the endpoints 104a-104e may use any suitable protocol or protocols for communicating information, such as Ethernet, Internet Protocol (IP), X.25, or frame relay. In particular embodiments, the endpoints 104a-104e communicate using an Ethernet layer and a Medium Access Control (MAC) layer. In addition, each of the endpoints 104a-104e could be fixed in a specific location or be mobile, and the endpoints 104a-104e could communicate with the switches 102a-102d over wired or wireless connections. Each of the endpoints 104a-104e includes any hardware, software, firmware, or combination thereof for transmitting information to and/or receiving information.

In particular embodiments, the communication network 100 may be segmented into different levels 106a-106b. Each of the levels 106a-106b includes some of the switches 102a-102d and/or some of the endpoints 104a-104e. The network 100 may be segmented into the different levels 106a-106b using any suitable criteria. For example, the network 100 may be segmented into the different levels 106a-106b based on the functions of the endpoints 104a-104e. As an example, the endpoints 104a-104b in the first level 106a could represent computing devices used by users, and the endpoints 104c-104e in the second level 106b could represent control devices used in a process or production environment. The network 100 could be segmented into any number of different levels using any other or additional criteria.

In one aspect of operation, at least one of the switches 102a-102d in the network 100 is capable of self-monitoring its operation. If a problem is detected, the switch is capable of taking corrective action. For example, in some embodiments, the switch includes a controller capable of performing a number of diagnostic tests, including self-checks performed at startup. In particular embodiments, the switch is prevented from forwarding any received information (such as Ethernet frames) until the controller enables the forwarding. If the diagnostic tests reveal a problem with the switch, the controller may not enable the forwarding (if it has not yet been enabled) or disable the forwarding (if it already has been enabled). The controller may also power down one or more ports of the switch to prevent the switch from attempting to link or linking with other components in the network 100.

Among other things, the diagnostic tests could include monitoring a power supply and a configuration of the switch. The diagnostic tests could also include tests to confirm whether the switch can change its configuration and recall changes to its configuration. In this way, the controller may prevent the switch from forwarding "garbage" frames containing invalid information or failing to forward valid frames. The controller may also prevent the switch from connecting to other components in the network 100 at improper speeds or using improper settings. In this document, the term "frame" refers to any set or grouping of information, including IP packets, frame relay frames, Ethernet frames, Asynchronous Transfer Mode (ATM) cells, or any other suitable information.

The preceding description represents one example embodiment where a switch performs specific tests and takes specific corrective actions in response to the test results. Other embodiments of the switch that perform other or additional tests may be used. Also, other embodiments of the switch that perform other or additional corrective actions may be used.

Although FIG. 1 illustrates one example of a communication network 100, various changes may be made to FIG. 1. For example, the communication network 100 could include any number of switches in any suitable arrangement. The communication network 100 could also include any number of endpoints in any suitable arrangement. Further, the communication network 100 could include any additional components according to particular needs. In addition, this document describes the self-monitoring and corrective functions as occurring in a switch (such as switch 102a). The self-monitoring and corrective functions could be performed in any other or additional network component (such as a router, bridge, gateway, hub, or other type of device or system).

FIG. 2 illustrates an example switch 102a in a communication network 100 according to one embodiment of this disclosure. The embodiment of the switch 102a shown in FIG. 2 is for illustration only. Other embodiments of the switch 102a may be used without departing from the scope of this disclosure. Also, while the structure shown in FIG. 2 is described with respect to the switch 102a of FIG. 1, the same or similar structure could be used in any or all of the switches 102a-102d in the network 100 of FIG. 1 or in any other suitable device or network.

In this example, the switch 102a includes nine ports 202a-202i. The ports 202a-202i represent structures capable of being coupled to network cables or other connections coupling the switch 102a to other components in the network 100. For example, each of the ports 202a-202i may represent a structure capable of being coupled to an Ethernet cable (straight-through or crossover cable). As a particular example, each of the ports 202a-202i may represent an RJ-45 jack capable of being coupled to a category 5 (Cat5) Shielded Twisted Pair (STP) or Unshielded Twisted Pair (UTP) cable. While nine ports 202a-202i are shown in FIG. 2, the switch 102a may include any suitable number of ports. In this document, the term "couple" and its derivatives refer to any direct or indirect communication between two or more elements, whether or not those elements are in physical contact with one another.

In some embodiments, each of the ports 202a-202i supports the IEEE 802.3 standard. For example, each of the ports 202a-202i may be capable of operating at a rate of 10 megabits per second (Mbit) or a rate of 100 Mbit. Also, each of the ports 202a-202i may be capable of operating in full duplex or half duplex mode. Further, each of the ports 202a-202i may be capable of performing auto-negotiation, which may be enabled or disabled. In addition, each of the ports 202a-202i may be capable of detecting whether a straight-through or crossover cable is being used. In particular embodiments, each of the ports 202a-202h is limited to operating in full duplex mode at the 10 Mbit or 100 Mbit rate with auto-negotiation enabled, and the port 202i is limited to operating in full duplex mode at the 100 Mbit rate with auto-negotiation disabled. Also, in particular embodiments, the port 202i represents a Media Independent Interface (MII) that may be attached to any standard MII device. As an example, the port 202i may be coupled to an Ethernet interface.

The switch 102a also includes a SingleMode Fiber Optic ("SMFIO") or MultiMode Fiber Optic ("MMFIO") transceiver module connector 204. The SMFIO/MMFIO connector 204 allows the switch 102a to be coupled to an upstream link partner or other component in the network 100 using a fiber optic cable. In particular, the SMFIO/MMFIO connector 204 allows the switch 102a to be coupled to a SMFIO or MMFIO transceiver module. The SMFIO transceiver module provides SingleMode Fiber Optic connectivity to the upstream link partner or other component using a dual-jacketed dual-fiber cable with an LC connector or other suitable cable. The MMFIO transceiver module provides MultiMode Fiber Optic connectivity to the upstream link partner or other component using a single-jacketed dual-fiber cable with an MT-RJ connector or other suitable cable. The SMFIO or MMFIO transceiver module could represent a module that is removable from the switch 102a.

In some embodiments, the SMFIO or MMFIO transceiver module may represent an optional component in the switch 102a. For example, the SMFIO or MMFIO transceiver module may only be needed if the upstream link partner or other component in the network 100 is separated from the switch 102a by an excessive distance. As a particular example, the SMFIO or MMFIO transceiver module may be required only if the switch 102a is separated from the upstream link partner or other component in the network 100 by more than one hundred meters of cable distance.

In some embodiments, when a fiber optic cable is inserted into a transceiver module coupled to the SMFIO/MMFIO connector 204, the port 202i is disabled or obstructed. For example, the case of the fiber optic cable could obstruct the port 202i. In particular embodiments, the presence of a fiber optic cable is detected upon startup, and power for the switch 102a is recycled after a fiber optic cable is inserted or removed from the SMFIO or MMFIO transceiver module.

The SMFIO/MMFIO connector 204 represents any hardware, software, firmware, or combination thereof capable of being coupled to a transceiver module for communication over a fiber optic cable. As particular examples, the SMFIO/MMFIO connector 204 could represent a connector capable of being coupled to an HFBR5903-A module from AGILENT TECHNOLOGIES and/or a V23848-C18-C45 module from INFINEON TECHNOLOGIES.

In some embodiments, the switch 102a is used in a cabinet to couple components of the cabinet (endpoints) to the network 100. In these embodiments, the ports 202a-202h may be coupled to other components in the cabinet. The port 202i or SMFIO/MMFIO connector 204 is used to couple the switch 102a to an upstream link partner or other component in the network 100. In particular embodiments, the switch 102a is used in a cabinet to attach C300 Controllers, Series C Fieldbus Interface Modules (FIMs), and FAULT TOLERANT ETHERNET (FTE) bridges to an L1 FIE network.

Figure 3:
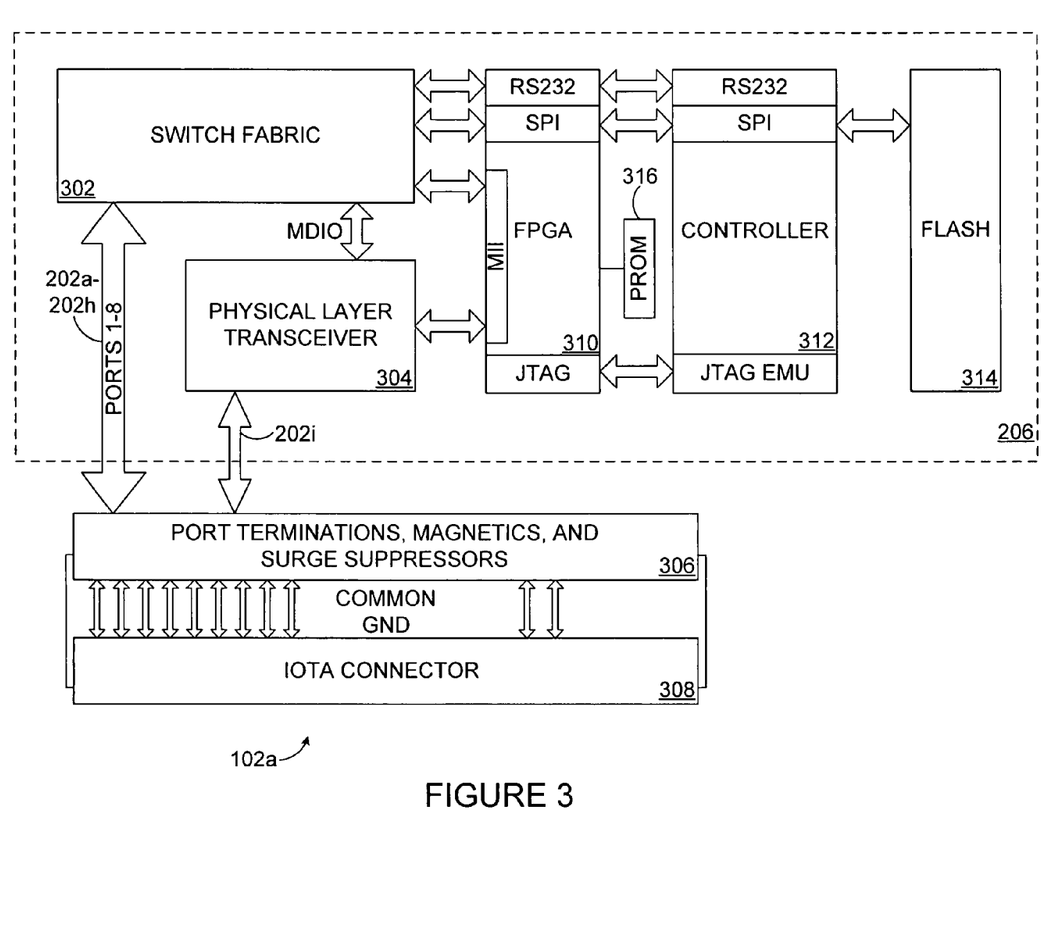
FIG. 3 illustrates additional details of an example switch in a communication network according to one embodiment of this disclosure.

A logic module 206 controls the operation of the switch 102a. For example, the logic module 206 may forward information between various ports 202a-202i of the switch 102a, allowing the switch 102a to perform forwarding functions in the network 100. The logic module 206 may also perform diagnostic tests on the switch 102a and take corrective action (such as disabling the ports 202a-202i and preventing the forwarding of information) if a problem with the switch 102a is detected. In addition, the logic module 206 may perform firewall functions or any other or additional functions in the switch 102a. The logic module 206 includes any hardware, software, firmware, or combination thereof for controlling the switch 102a. Additional details of the logic module 206 are shown in FIG. 3, which is described below.

The switch 102a further includes an interface (I/F) connector 208. The I/F connector 208 allows other components external to the switch 102a to interact with the logic module 206. For example, the I/F connector 208 could allow an external component to communicate with elements of the logic module 206 over a serial bus. The I/F connector 208 represents any suitable structure capable of being coupled to a cable or other interface to an external component. The I/F connector 208 could, for example, represent a 10-pin or 30-pin connector.

In addition, the switch 102a includes various voltage and ground pins 210. The voltage and ground pins 210 are capable of being coupled to a supply voltage and grounds, which are used to supply power to the switch 102a. In this example, the pin coupled to the supply voltage is denoted $V_{cc}$ and may have any suitable value, such as a voltage between approximately +18 VDC and approximately +30 VDC. The pin coupled to a common ground is denoted "COM GND." The pin coupled to a ground that is used by the ports 202a-202i is denoted "CHS GND" (which stands for chassis ground).

In some embodiments, the switch 102a includes multiple copies of the structure shown in FIG. 2 (such as a pair of the structures). In these embodiments, the loss of one of the structures may not result in loss of view in the network 100.

Although FIG. 2 illustrates one example of a switch 102a in a communication network 100, various changes may be made to FIG. 2. For example, either or both of the SMFIO/MMFIO connector 204 and the I/F connector 208 could be omitted from the switch 102a. Also, the switch 102a could include any number and arrangement of ports 202a-202i. In addition, while described as communicating over copper (such as Ethernet) and fiber optic transmission media, the switch 102a could communicate using any suitable wired or wireless transmission media.

FIG. 3 illustrates additional details of an example switch 102a in a communication network 100 according to one embodiment of this disclosure. In particular, FIG. 3 illustrates additional details of the logic module 206 of FIG. 2, as well as additional components used to couple the ports 202a-202i to external components in the network 100. The embodiment of the switch 102a shown in FIG. 3 is for illustration only. Other embodiments of the switch 102a may be used without departing from the scope of this disclosure. Also, while the structure shown in FIG. 3 is described with respect to the switch 102a of FIG. 1, the same or similar structure could be used in any or all of the switches 102a-102d in the network 100 of FIG. 1 or in any other suitable device or network.

In this example, the logic module 206 in the switch 102a includes a switch fabric 302. The switch fabric 302 is capable of transferring information (such as Ethernet frames) between ports 202a-202i. For example, the switch fabric 302 may receive an Ethernet frame, identify a destination, and transmit the frame through the port associated with the destination. If a transceiver module is coupled to the SMFIO/MMFIO connector 204, the switch fabric 302 could also transfer information to and from the transceiver module. The switch fabric 302 includes any hardware, software, firmware, or combination thereof for transferring information. The switch fabric 302 could, for example, represent a BCM5338M 9-port switch from BROADCOM CORPORATION.

In some embodiments, the switch fabric 302 is configurable using settings stored in an internal memory. For example, values stored in the internal memory may define or control the operations of the switch fabric 302, such as by enabling or disabling certain features of the switch fabric 302. The internal memory may be programmed using a Serial Peripheral Interface (SPI) bus or any other suitable mechanism.

In particular embodiments, the switch fabric 302 could act as a proxy for configuring an externally attached MII device, which may simplify programming of multiple devices. Also, in particular embodiments, the switch fabric 302 may use a "store and forward" technique, where each received frame is stored in a packet buffer in the switch fabric 302 before being forwarded to the appropriate port. For example, the switch fabric 302 may include 256 kilobytes of packet buffer static random access memory (SRAM). Space in the SRAM may be allocated in a dynamic manner without assigning a specific amount of SRAM to a particular port unless a Quality of Service (QoS) feature is enabled.

In some embodiments, the switch fabric 302 also maintains a lookup table containing a mapping of MAC addresses to ports 202a-202i. When a frame is received on a port, the source MAC address in the frame is associated with that port in the lookup table. If future frames are received with that MAC address as the destination address, the frames are only forwarded to the port listed in the lookup table. In particular embodiments, when the switch 102a receives a frame for which there is no mapping in the lookup table, the frame is forwarded to all ports to ensure that the intended destination receives the frame. In other particular embodiments, this feature is disabled to prevent a possible network attack from flooding in-cabinet or other devices with malicious traffic.

The logic module 206 in the switch 102a also includes a physical layer transceiver 304. The physical layer transceiver 304 allows the switch 102a to communicate with an upstream link partner using any of a wide variety of communication protocols. The switch fabric 302 could communicate with the port 202i through an MII interface. The MII interface may, for example, represent a 16-wire, 4-bit wide interface that operates at 100 Mbit (25 MHz) or 10 Mbit (2.5 MHz). The MII interface may be coupled to a variety of different physical layer transceivers 304, such as an Ethernet transceiver. This allows the switch 102a to use different protocols in different situations by providing an appropriate physical layer transceiver 304 in the switch 102a. The physical layer transceiver 304 includes any hardware, software, firmware, or combination thereof for supporting communication with another network component. The physical layer transceiver 304 could, for example, represent an AC101 integrated circuit by BROADCOM CORPORATION, which operates using 3.3V.

In this embodiment, the switch fabric 302 is coupled to the physical layer transceiver 304 indirectly through the MII interface and directly through a management data input/output (MDIO) port. In some embodiments, the switch fabric 302 may be capable of configuring the physical layer transceiver 304, and no intervention or action may be required by other components in the switch 102a. In particular embodiments, the switch fabric 302 configures the physical layer transceiver 304 through a mapped page of memory in the switch fabric 302. Registers in the physical layer transceiver 304 may appear as switch registers to a controller in the switch 102a, and the switch fabric 302 may perform translations internally.

In this example, various components allow the switch 102a to be coupled to physical transmission media, such as Ethernet or other network cables. In particular embodiments, the Ethernet or other copper network cables have a 50Ω impedance in all locations along a transmission path, including in printed wire assemblies, and each signal pair may be equilinear.

As shown in FIG. 3, the switch 102a includes port terminations, magnetics, and surge suppressors 306. The port terminations represent structures that terminate the ports 202a-202i, such as Ethernet port terminations. The magnetics represent isolation magnetics used to isolate the ports 202a-202i from the Ethernet cables or other transmission media. For example, the magnetics could include 1:1 transformers at the outputs of the logic module 206. In some embodiments, each transformer is symmetric, so the receiver topology is identical to the transmitter topology. In particular embodiments, the magnetics offer at least 1,500 VRMS-MIN of high potential isolation. Long wires with no ground reference may carry analog Ethernet signals, and it is possible to develop large static and transient voltages on those lines. In particular embodiments, a transient voltage suppressor is located on each pair of analog Ethernet signal lines between a connector for the lines and an isolation transformer. The surge suppressors help to protect the switch 102a against voltage surges.

The switch 102a also includes an input/output terminal assembly ("IOTA") connector 308. The IOTA connector 308 represents a structure capable of receiving the transmission media coupled to the switch 102a. For example, the IOTA connector 308 could represent a structure capable of receiving nine different Ethernet cables.

In this example, the logic module 206 also includes a field programmable gate array (FPGA) 310. The FPGA 310 is capable of performing firewall functions in the switch 102a. For example, the FPGA 310 may be capable of examining frames received over an uplink port (port 202i) and only allow frames containing valid control traffic to enter the switch fabric 302.

In this embodiment, the FPGA 310 includes the MII interface discussed above. The MII interface allows the switch fabric 302 to transmit and receive frames of information to and from the physical layer transceiver 304. Because traffic to and from the physical layer transceiver 304 passes through the FPGA 310, the FPGA 310 is capable of performing the firewall functions for that traffic.

The FPGA 310 includes any suitable logic capable of performing firewall functions in the switch 102a. For example, the FPGA 310 could represent an FPGA that operates using 3.3V for input/output and 1.8V for core operations.

The logic module 206 further includes a controller 312. The controller 312 is capable of performing various functions in the switch 102a to manage and control the switch 102a. For example, the controller 312 may perform power-on diagnostics and runtime background diagnostics to detect any problems with the switch 102a. The controller 312 could also perform error handling when problems with the switch 102a are detected. The controller 312 could further perform FPGA configuration and updating, interrupt handling, and any other suitable function. The controller 312 includes any hardware, software, firmware, or combination thereof for controlling the switch 102a. The controller 312 could, for example, represent an 8-bit 8051 family microprocessor containing embedded firmware. As a particular example, the controller 312 could represent an 89LPC936 processor from PHILIPS SEMICONDUCTOR, which operates using 3.3V for input/output and 3.3V for core operations.

In some embodiments, the functions of the controller 312 are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

In addition, the logic module 206 includes one or more memories. In this example, the logic module 206 includes an SPI flash memory 314 and a programmable read only memory (PROM) 316. The flash memory 314 represents a memory capable of storing data used by the controller 312, the FPGA 310, or other components in the switch 102a. For example, the flash memory 314 could store two sets of images (such as a default image and an updated image) for the FPGA 310 and the controller 312. The flash memory 314 could represent any suitable memory, such as a serial memory.

The PROM 316 stores information identifying the configuration of the FPGA 310 initially after power-on. The contents of the PROM 316 may be programmed in the factory with an in-circuit tester, via a Joint Test Action Group (JTAG) interface, or in any other suitable manner. In some embodiments, the image in the PROM 316 contains enough information for the FPGA 310 to perform the firewall function described above. In particular embodiments, this image provides the FPGA 310 with logic to be able to accept reprogramming frames from the port 202i, store the reprogramming frames in the flash memory 314, and program the controller 312 with the latest image in the flash memory 314.

The switch 102a may support one or multiple communication ports (in addition to the ports 202a-202i) used during operation of the switch 102a. For example, the switch 102a could support a Universal Asynchronous Receiver-Transmitter (UART) port. The UART port may be used to support an on-board serial debug console as well as to establish a method of communication between the controller 312 and the FPGA 310. A two-wire UART port may be daisy-chained from the controller 312 to the FPGA 310 and then to the IOTA connector 308. In particular embodiments, the UART port operates at 9,600 baud with no parity, eight data bits, and one stop bit, although the UART port could be configured to operate in other modes and at other speeds.

An SPI port provides access to an SPI bus coupling the switch fabric 302, the FPGA 310, the controller 312, and the flash memory 314. The SPI bus may be used to configure the switch fabric 302 and to update the FPGA 310 and the firmware used by the controller 312. During normal operation, the controller 312 may use the SPI bus to configure the switch fabric 302 and to perform diagnostics. During an update, the FPGA 310 may use the SPI bus to load new images into the flash memory 314. The SPI bus may be arbitrated by software handshaking between the controller 312 and the FPGA 310, where the controller 312 is the bus master during normal operation. The FPGA 310 can request the bus from the controller 312 by sending a request over the UART. If the bus is granted, the controller 312 may tristate its SPI pins and notify the FPGA 310 that the SPI bus is available. When the FPGA 310 is finished, it notifies the controller 312, and the bus is returned. In particular embodiments, only the controller 312 and the FPGA 310 may act as SPI bus masters, and the flash memory 314 and the switch fabric 302 may be slave-only devices. Also, each device coupled to the SPI bus may have a unique address, which may prevent multiple devices from answering an SPI transaction request. The flash memory 314 may be accessible to both the controller 312 and the FPGA 310 on the SPI bus.

A JTAG port allows the switch 102a to be programmed from an external tool. In this example, the controller 312 may not be a native JTAG device, so the JTAG port is emulated in the controller 312. The JTAG port may provide access to the controller 312, the FPGA 310, and the PROM 316.

Various clock signals may be used by various components in the switch 102a. For example, the switch fabric 302 and the physical layer transceiver 304 could operate using a 25 MHz clock signal with a 50 parts per million (PPM) accuracy. Also, the FPGA 310 could operate using a 25 MHz clock signal with high accuracy. In particular embodiments, the switch fabric 302 and the physical layer transceiver 304 are clocked using a resonant crystal suitable for use in Ethernet applications, and the FPGA 310 is clocked with a single-ended crystal-derived oscillator.

In one aspect of operation, the controller 312 is capable of enabling and disabling the forwarding of frames by the switch fabric 302. In particular embodiments, the switch fabric 302 is disabled from forwarding frames by default until the controller 312 enables the forwarding. The controller 312 performs various diagnostic tests (such as tests performed at power-on and/or during runtime). If the controller 312 detects an error in the switch 102a, the controller 312 does not enable the forwarding (if it is currently disabled) or disables the forwarding (if it is currently enabled). In this way, the controller 312 may prevent the switch fabric 302 from forwarding garbage frames, incorrectly forwarding valid frames, or failing to forward valid frames. The controller 312 could also power down the ports 202a-202i or the switch 102a itself to prevent the switch 102a from linking with other components in the network 100.

The controller 312 may perform any suitable diagnostic tests to identify problems with the switch 102a. The following examples are for illustration only. Other or additional tests could be performed by the controller 312 without departing from the scope of this disclosure.

In some embodiments, the controller 312 performs diagnostic tests and configuration routines at power-on, and these tests and routines may generally be referred to as a power-on self test (POST). The tests and routines could include testing for an under-voltage condition in the switch 102a, validating an internal memory (such as an EEPROM) in the controller 312, checking whether the SPI bus is operating properly, and checking whether the MDIO port of the switch fabric 302 is operating properly. The tests and routines could also include choosing an image for the FPGA 310, programming the FPGA 310, and reading the programming back from the FPGA 310.

Once the POST is complete or as part of the POST, the controller 312 may configure the switch fabric 302 for operation in the network 100. This may include the controller 312 performing read/modify/write operations to the internal memory of the switch fabric 302. For example, the controller 312 may need to modify each value in the internal memory that needs to be configured to a value other than a default value. In some embodiments, the memory space of the switch fabric 302 is arranged into pages, each containing a particular class of information.

When configuring the switch fabric 302 in this manner, the controller 312 may determine if and when the switch fabric 302 fails to be configured properly. For example, the controller 312 may detect when a value stored in the internal memory of the switch fabric 302 cannot be changed. The controller 312 may also detect when a value stored in the internal memory cannot be retrieved. The controller 312 could further detect when the switch fabric 302 is configured in an improper manner, such as by singly or repeatedly retrieving values from the internal memory and comparing the values to expected values.

The controller 312 further may detect various problems associated with violations of configuration rules. Configuration rules represent rules defining how the switch 102a may operate. For example, configuration rules could indicate that ports 202a-202h must be connected to a link partner at either 100 Mbit full duplex or 10 Mbit full duplex. The configuration rules could also indicate that port 202i must be connected to a link partner at 100 Mbit full duplex.

In addition, the controller 312 could detect power management problems in the switch 102a. For example, the switch 102a could include a power management system that generates 1.8V and 3.3V output voltage signals used by other components in the switch 102a. The power management system could detect when the output voltage signals vary from an expected amount and signal the controller 312.

In response to one or more of the problems described above, the controller 312 may take any suitable corrective action. For example, the controller 312 could disable the switch fabric 302 by not enabling or disabling the forwarding of frames by the switch fabric 302. The controller 312 could use any suitable technique to enable or disable frame forwarding by the switch fabric 302. As an example, the controller 312 could set a value or values in one or more locations in the internal memory of the switch fabric 302 to enable or disable frame forwarding. The controller 312 could also power down the ports 202a-202i or other interfaces (such as the SMFIO/MMFIO connector 204). The controller 312 could further power down the entire switch 102a. If the switch 102a includes multiple copies of the structure shown in FIG. 2, the controller 312 could power down one of the structures, allowing the other structure(s) to continue operating in the network 100.

Although FIG. 3 illustrates additional details of one example of a switch 102a in a communication network 100, various changes may be made to FIG. 3. For example, the functional division shown in FIG. 3 is for illustration only. Various components in FIG. 3 could be combined or omitted and additional components could be added according to particular needs.

Figure 4:
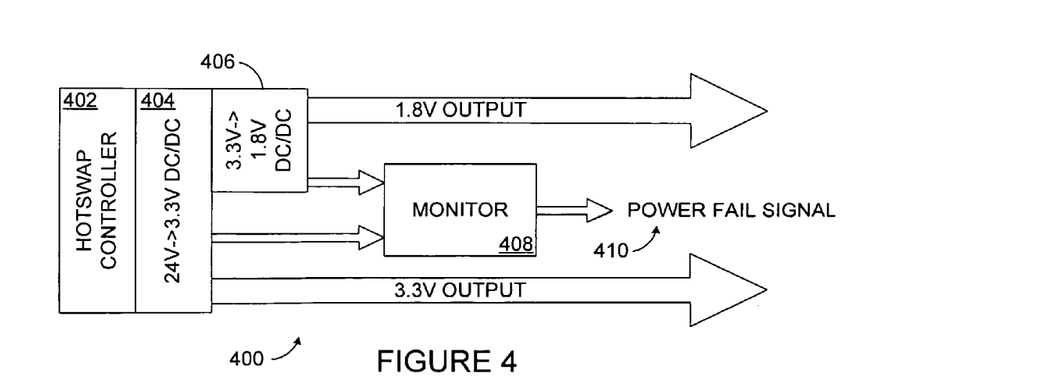
FIG. 4 illustrates an example power management system of a switch in a communication network according to one embodiment of this disclosure.

FIG. 4 illustrates an example power management system 400 of a switch 102*a* in a communication network 100 according to one embodiment of this disclosure. The embodiment of the power management system 400 shown in FIG. 4 is for illustration only. Other embodiments of the power management system 400 may be used without departing from the scope of this disclosure. Also, while the structure shown in FIG. 4 is described with respect to the switch 102*a* of FIG. 1, the same or similar structure could be used in any or all of the switches 102*a*-102*d* in the network 100 of FIG. 1 or in any other suitable device or network.

In this example, the power management system 400 includes a hotswap controller 402. The hotswap controller 402 allows the switch 102*a* to be inserted and removed from a live powered system without causing a current in-rush or arcing on the power or ground pins of the switch 102*a*. In some embodiments, the hotswap controller 402 may be windowed so that it does not initiate a power-up of the switch 102*a* unless an input voltage is within a specific range, such as a range of 17.6V-31.0V. In particular embodiments, when the input voltage enters that range, the hotswap controller 402 may begin to ramp up a series power field effect transistor (FET) to apply main power to the switch 102*a*. The FET may be initially turned off upon insertion of the switch 102*a* and remain turned off until the hotswap controller 402 increases the gate voltage. The hotswap controller 402 may also have a sense resistor to monitor in-rush currents and to modulate the gate voltage on the FET to limit the in-rush current to a value that is determined by the resistance of the sense resistor. A catch diode from ground to the main input may prevent arcing upon removal. When the input voltage exits the voltage range, the hotswap controller 402 may immediately turn off the FET. The hotswap controller 402 includes any hardware, software, firmware, or combination thereof for allowing insertion and removal of the switch 102*a* into a powered system.

A DC/DC converter 404 is coupled to the hotswap controller 402. The DC/DC converter 404 is capable of receiving a voltage provided by the hotswap controller 402 and converting the voltage to a lower voltage. In this example, the DC/DC converter 404 receives a 24V signal from the hotswap controller 402 and converts the voltage to a 3.3V signal. The DC/DC converter 404 then outputs the 3.3V signal for use by other components in the switch 102*a*. The DC/DC converter 404 includes any hardware, software, firmware, or combination thereof for converting DC voltages. The DC/DC converter 404 may, for example, represent a monolithic DC/DC controller with integrated power FETs. As a particular example, the DC/DC converter 404 could represent an LTC3430EFE converter from LINEAR TECHNOLOGIES.

A second DC/DC converter 406 is coupled to the DC/DC converter 404. The second DC/DC converter 406 is capable of receiving the voltage provided by the DC/DC converter 404 and converting the voltage to a lower voltage. In this example, the DC/DC converter 406 receives a 3.3V signal from the DC/DC converter 404 and converts the voltage to a 1.8V signal. The DC/DC converter 406 then outputs the 1.8V signal for use by other components in the switch 102*a*. The DC/DC converter 406 includes any hardware, software, firmware, or combination thereof for converting DC voltages. The DC/DC converter 406 may, for example, represent a monolithic DC/DC controller with integrated power FETs. As a particular example, the DC/DC converter 406 could represent an LTC3412EFE converter from LINEAR TECHNOLOGIES. Also, the FPGA 310 may have certain power sequencing and startup timing requirements that should be satisfied, such as requiring that the 1.8V power supply take at least 2 ms to ramp to full voltage. The DC/DC converter 406 may include a soft start circuit that satisfies this requirement.

A voltage monitor 408 monitors the outputs of the DC/DC converters 404, 406. The voltage monitor 408 also outputs a power fail signal 410 if and when a problem is detected with the outputs of the DC/DC converters 404, 406. The power fail signal 410 helps to ensure proper shutdown of the switch 102*a* if one or both of the output voltages falls below minimum thresholds. For example, the voltage monitor 408 could generate a power fail signal 410 indicating a problem if either of the output voltages falls seven percent below its expected value. The voltage monitor 408 includes any hardware, software, firmware, or combination thereof for monitoring one or more voltages.

In some embodiments, the power fail signal 410 from the voltage monitor 408 acts as a high-priority interrupt at the controller 312. The interrupt service routine for this interrupt places the switch fabric 302 and the physical layer transceiver 302 into a reset state to avoid the transmission of corrupted frames during a shutdown. Upon startup or when an undervoltage condition is detected, the voltage monitor 408 may hold the power fail signal 410 at a particular level (such as a low logical level) for a specified amount of time (such as holding the signal until approximately 400 ms after the voltage returns to a nominal level).

Although FIG. 4 illustrates one example of a power management system 400 of a switch 102*a* in a communication network 100, various changes may be made to FIG. 4. For example, other or additional output voltages could be produced by the power management system 400. Also, the hotswap controller 402 could be omitted from the power management system 400. In addition, any number of DC/DC converters may be used in the power management system 400, and the voltage monitor 408 could receive and monitor voltages produced by any number of the DC/DC converters.

Figure 5:
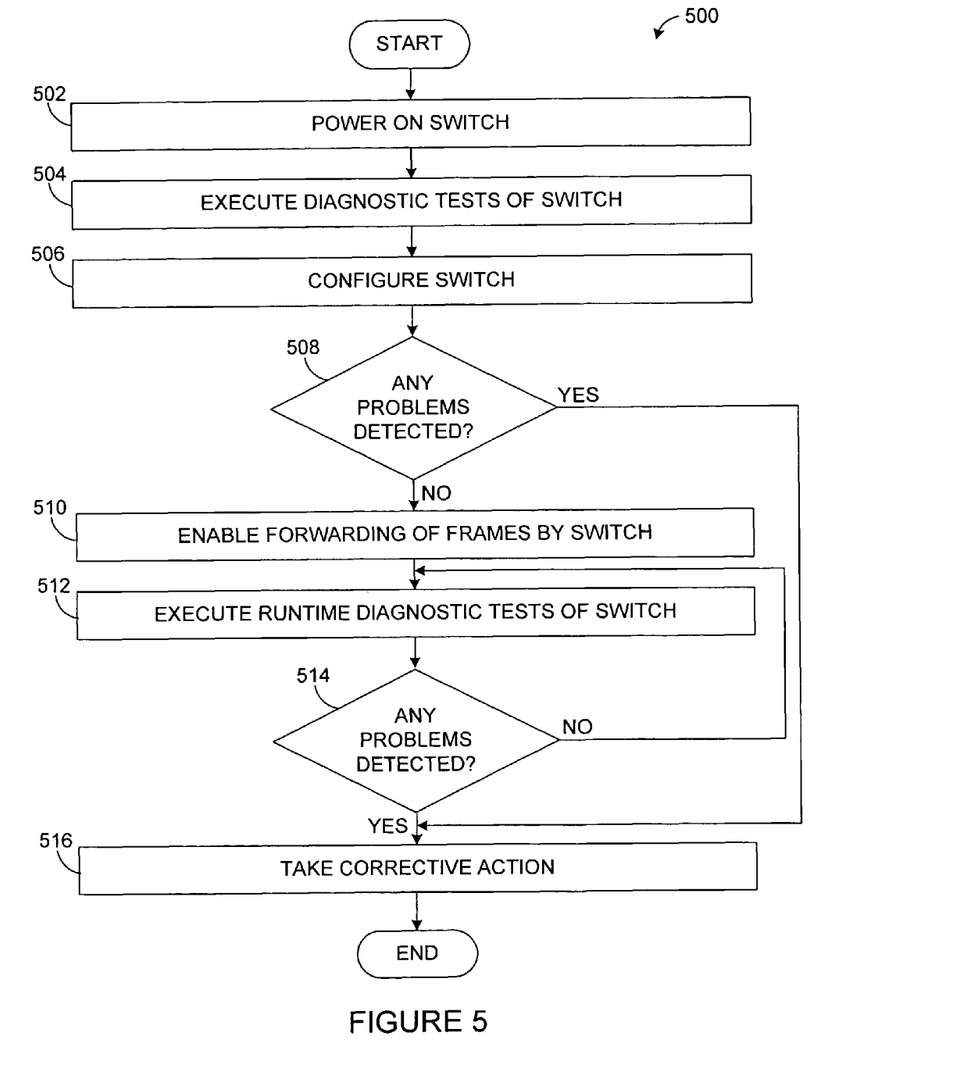
FIG. 5 illustrates an example method for network error prevention according to one embodiment of this disclosure.

FIG. 5 illustrates an example method 500 for network error prevention according to one embodiment of this disclosure. For ease of explanation, the method 500 is described with respect to the switch 102*a* of FIGS. 2 and 3 operating in the network 100 of FIG. 1. The method 500 could be used by any other suitable apparatus and in any other suitable system without departing from the scope of this disclosure.

The switch 102*a* is powered on at step 502. This may include, for example, personnel installing the switch 102*a* in a cabinet and the cabinet supplying power to the switch 102*a*. This may also include the switch 102*a* being reset or otherwise experiencing a loss of power followed by a return of power.

The switch 102*a* executes one or more initial diagnostic tests at step 504. This may include, for example, the controller 312 in the switch 102*a* performing a power-on self test that includes validating an internal memory in the controller 312, checking whether the SPI bus is operating properly, checking whether the MDIO port of the switch fabric 302 is operating properly, and checking whether appropriate voltage levels are present. The controller 312 could perform any other or additional diagnostic tests.

The switch 102*a* is configured at step 506. This may include, for example, the controller 312 performing read/modify/write operations involving one or more locations in the internal memory of the switch fabric 302. This may also include the controller 312 determining if any operations involving the internal memory fail, such as when a value cannot be retrieved from or written to the internal memory. This may further include the controller 312 determining whether the ports 202*a*-202*i* are configured correctly or cannot be configured, such as determining whether the ports 202a-202h are configured at either 100 Mbit full duplex or 10 Mbit full duplex and whether the port 202i is configured at 100 Mbit full duplex.

The switch 102a determines if any problems have been detected at step 508. This may include, for example, the controller 312 determining whether any of the initial diagnostic tests have failed and/or the switch 102a has not or cannot be configured as desired.

If no problem is detected, the switch 102a enables the forwarding of frames at step 510. This may include, for example, the controller 312 setting a particular value or values in the internal memory of the switch fabric 302 to appropriate value(s). The switch 102a then executes one or more runtime diagnostic tests at step 512. This may include, for example, the controller 312 repeatedly checking the internal memory of the switch fabric 302 to ensure that the internal memory contain appropriate values. This may also include the controller 312 continuing to check the voltage levels generated in the switch 102a. The switch 102a determines if any problems have been detected at step 514. If no problems are detected, the switch 102a returns to step 512 to continue executing the runtime diagnostic tests.

If a problem is detected at step 508 or step 514, the switch 102a takes one or more corrective actions at step 516. This may include, for example, the controller 312 disabling the forwarding of frames by the switch fabric 302 (if the forwarding is already enabled). This may also include the controller 312 powering down the ports 202a-202i or other interfaces (such as the SMFIO/MMFIO connector 204) or the entire switch 102a. In this way, erroneous, incorrect, or excessive forwarding of information by the switch 102a may be reduced or prevented in the network 100.

Although FIG. 5 illustrates one example of a method 500 for network error prevention, various changes may be made to FIG. 5. For example, the switch 102a could support a subset of the tests shown in FIG. 5 or additional tests. As a particular example, the switch 102a could take the corrective actions only if the initial tests after power-on indicate a problem. Also, the configuration at step 506 could be combined with the initial diagnostic tests at step 504.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
performing a plurality of tests on at least two redundant structures of a network component, each redundant structure having a logic module that comprises:
a switch fabric configured to forward frames of information in a network, the switch fabrics in the redundant structures configured to be coupled to a common set of link partners;
a physical layer transceiver configured by its associated switch fabric to communicate using at least one protocol; and
a controller; and
detecting, with the controller in at least one of the redundant structures, a failure of at least one of the redundant structures based on the plurality of tests; and
disabling the forwarding of the frames of information by the switch fabric in at least one of the redundant structures based upon the detection of the failure;
wherein at least one of the tests is a test of each switch fabric's ability to recall and change its configuration based on configurable settings stored in a memory of that switch fabric.

2. The method of claim 1, wherein:
at least one of the tests is performed in response to the network component powering on;
each switch fabric is initially disabled from forwarding the frames of information; and
the forwarding of the frames of information by at least one of the switch fabrics is not enabled in response to detecting a failure of at least one of the tests.

3. The method of claim 1, wherein:
at least one of the tests is performed after at least one of the switch fabrics begins forwarding the frames of information; and
the forwarding of the frames of information by at least one of the switch fabrics is disabled in response to detecting a failure of at least one of the tests.

4. The method of claim 1, wherein the tests further comprise:
determining whether an under-voltage condition is present in the network component;
validating a memory in at least one of the controllers of the network component;
determining whether at least one bus in the network component is operating properly;
determining whether at least one port in the network component is operating properly; and
determining whether at least one logic element in the network component can be programmed properly.

5. The method of claim 1, wherein the tests comprise:
determining whether each switch fabric in the network component can be configured properly;
determining whether information identifying the configuration of each switch fabric can be retrieved from the memory of each switch fabric; and
determining whether an actual configuration of each switch fabric varies from an expected configuration.

6. The method of claim 1, wherein the tests further comprise determining whether one or more configuration rules are violated based on one or more current connections between the network component and the link partners, the configuration rules defining allowable speed, duplex, and auto-negotiation settings for the one or more current connections.

7. The method of claim 1, further comprising:
in response to detecting a failure of at least one of the tests, powering down the network component.

8. The method of claim 1, wherein the network component comprises one of: a switch and a router; and
wherein the network component is configured to be coupled to each link partner through multiple communication paths, the communication paths associated with the different redundant structures of the network component.

9. The method of claim 1, further comprising:
detecting that an under-voltage condition associated with a voltage used by the network component is present;
generating a high-priority interrupt for at least one of the controllers in the network component in response to the under-voltage condition; and
at the at least one controller, causing the switch fabric and the physical layer transceiver in at least one of the redundant structures to each enter a reset state in response to receiving the high-priority interrupt;
wherein the high-priority interrupt is maintained until the voltage used by the network component returns to a nominal level for a specified period of time.

10. An apparatus, comprising:
at least two redundant structures, each redundant structure comprising:
a plurality of interfaces configured to be coupled to a plurality of link partners in a network, wherein the redundant structures are configured to be coupled to a common set of link partners; and
a logic module comprising:
a switch fabric configured to forward frames of information to or from the plurality of interfaces;
a physical layer transceiver adapted to be configured by its associated switch fabric to communicate using at least one protocol; and
a controller configured to:
perform a plurality of tests on its associated redundant structure;
detect a failure of the associated redundant structure based on the plurality of tests; and
disable the forwarding of the frames of information by the switch fabric in the associated redundant structure based upon the detection of the failure of the associated redundant structure;
wherein at least one of the tests is a test of each switch fabric's ability to recall and change its configuration based on configurable settings stored in a memory of that switch fabric.

11. The apparatus of claim 10, wherein:
at least one of the tests is performed in response to the apparatus powering on;
the switch fabric in each redundant structure is initially disabled from forwarding the frames of information; and
the controller in at least one of the redundant structures does not enable the forwarding of the frames of information by the switch fabric in that redundant structure in response to a detected failure of at least one of the tests.

12. The apparatus of claim 10, wherein:
at least one of the tests is performed after at least one of the switch fabrics begins forwarding the frames of information; and
the controller in at least one of the redundant structures disables the forwarding of the frames of information by the switch fabric in that redundant structure in response to a detected failure of at least one of the tests.

13. The apparatus of claim 10, wherein the tests further comprise:
determining whether an under-voltage condition is present in the apparatus;
validating a memory in the controller of each redundant structure;
determining whether a bus in each redundant structure is operating properly;
determining whether a port in each redundant structure is operating properly; and
determining whether a logic element in each redundant structure can be programmed properly.

14. The apparatus of claim 10, wherein the tests comprise:
determining whether each switch fabric can be configured properly;
determining whether information identifying the configuration of each switch fabric can be retrieved from the memory of each switch fabric; and
determining whether an actual configuration of each switch fabric varies from an expected configuration.

15. The apparatus of claim 10, wherein the tests further comprise determining whether one or more configuration rules are violated based on one or more current connections between a network component containing the redundant structures and the link partners, the configuration rules defining allowable speed, duplex, and auto-negotiation settings for the one or more current connections.

16. The apparatus of claim 10, wherein at least one of the controllers is further configured to:
in response to detecting a failure of at least one of the tests, power down the apparatus.

17. The apparatus of claim 10, wherein the plurality of interfaces in each redundant structure comprises at least one of: a port configured to be coupled to a copper cable, and a connector configured to receive a transceiver module that is configured to be coupled to a fiber optic cable.

18. The apparatus of claim 10, wherein the switch fabric in each redundant structure is:
coupled directly to a first subset of the interfaces in that redundant structure; and
coupled indirectly to a second subset of the interfaces in that redundant structure through the physical layer transceiver, wherein the switch fabric is coupled directly to the physical layer transceiver and indirectly to the physical layer transceiver through a logic element, wherein all traffic received through the second subset of interfaces is sent to the first subset of interfaces through the logic element and the switch fabric, and wherein the logic element is configured to prevent invalid traffic from the second subset of interfaces from reaching the first subset of interfaces.

19. The apparatus of claim 18, wherein, in each redundant structure:
the logic element, the controller, the switching element, and a memory configured to store instructions executed by the controller are coupled to a bus;
the logic element and the controller are configured to act as bus masters and the switching element and the memory are configured to act as bus slaves;
the controller is configured to use the bus to configure the switching element; and
during an update, the logic element is configured to request use of the bus, the controller is configured to grant use of the bus to the logic element and to tristate its interface to the bus, and the logic element is configured to load a new image into the memory over the bus and to notify the controller when loading is complete.

20. The apparatus of claim 10, wherein:
the switch fabric in each redundant structure is configured to configure the physical layer transceiver through a mapped memory page in the memory of the switch fabric; and
registers in the physical layer transceiver appear as switch fabric registers to the controller in each redundant structure.

21. The apparatus of claim 10, wherein:
the plurality of interfaces in each redundant structure comprises (i) multiple ports configured to be coupled to electrical signal cables and (ii) a connector configured to receive a transceiver module that is configured to be coupled to a fiber optic cable; and
one of the ports configured to be coupled to one of the electrical signal cables is obstructed and power to at least one of the redundant structures is recycled when the transceiver module is actually coupled to the fiber optic cable.

22. A non-transitory computer readable storage medium embodying a computer program, the computer program comprising computer readable program code for:
performing a plurality of tests on at least two redundant structures of a network component, each redundant structure having a logic module comprising:
a switch fabric configured to forward frames of information in a network, the switch fabrics in the redundant structures configured to be coupled to a common set of link partners;
a physical layer transceiver configured by its associated switch fabric to communicate using at least one protocol; and
a controller;
detecting, with the controller in at least one of the redundant structures, a failure of at least one of the redundant structures based on the plurality of tests; and
disabling the forwarding of the frames of information by the switch fabric in at least one of the redundant structures based upon the detection of the failure;
wherein at least one of the tests is a test of each switch fabric's ability to recall and change its configuration based on configurable settings stored in a memory of that switch fabric.

23. The computer readable storage medium of claim 22, wherein:
at least one of the tests is performed in response to the network component powering on;
each switch fabric in the network component is initially disabled from forwarding the frames of information; and
the forwarding of the frames of information by at least one of the switch fabrics in the network component is not enabled in response to detecting a failure of at least one of the tests.

24. The computer readable storage medium of claim 22, wherein:
at least one of the tests is performed after at least one of the switch fabrics begins forwarding the frames of information; and
the forwarding of the frames of information by at least one of the switch fabrics is disabled in response to detecting a failure of at least one of the tests.

* * * * *